(12) United States Patent  
Ozaki

(10) Patent No.: US 6,695,729 B2
(45) Date of Patent: Feb. 24, 2004

(54) CHAIN SHIFTING ASSEMBLY FOR BICYCLES

(75) Inventor: Nobuo Ozaki, Osaka (JP)

(73) Assignee: Po-Cheng Chen (TW)

( * ) Notice: Subject to any disclaimer, the term of this patent is extended or adjusted under 35 U.S.C. 154(b) by 57 days.

(21) Appl. No.: 09/984,670

(22) Filed: Oct. 30, 2001

(65) Prior Publication Data

US 2003/0083161 A1 May 1, 2003

(51) Int. Cl.⁷ ................................................. F16H 7/22
(52) U.S. Cl. ........................................... 474/80; 474/82
(58) Field of Search ............................ 474/78, 80, 82

(56) References Cited

U.S. PATENT DOCUMENTS

| | | | | | |
|---|---|---|---|---|---|
| 4,030,374 A | * | 6/1977 | Isobe | ............................ | 474/82 |
| 4,362,523 A | * | 12/1982 | Huret | ............................ | 474/82 |
| 4,479,787 A | * | 10/1984 | Bonnard | ............................ | 474/82 |
| 4,604,078 A | * | 8/1986 | Nagano | ............................ | 474/80 |
| 4,756,704 A | * | 7/1988 | Nagano | ............................ | 474/144 |
| 5,389,043 A | * | 2/1995 | Hsu | ............................ | 474/80 |

* cited by examiner

Primary Examiner—David A. Bucci
Assistant Examiner—Timothy McAnulty
(74) Attorney, Agent, or Firm—Bacon & Thomas, PLLC

(57) ABSTRACT

A chain shifting assembly for bicycles includes a fixed member fixed to the bicycle frame and an operation member is pivotally connected to the fixed member. The operation member includes first, second and third arms wherein one end of a shifting member is connected to the first arm and a derailleur cable is fixed to the second arm or the third arm. The arms radially extend outwardly from the junction pivotally connecting the operation member and the fixed member. A shift frame is connected to the other end of the shifting member. An angle limitation member is pivotally connected to the fixed member and the shifting member respectively. A spring is connected between the fixed member and the angle limitation member. The operation member is rotated about a center thereof and the track of the shift frame is a parabola so as to smoothly shift the chain among the sprockets.

3 Claims, 7 Drawing Sheets

CHAIN SHIFTING ASSEMBLY FOR BICYCLES

FIELD OF THE INVENTION

The present invention relates to a chain shifting assembly for bicycles wherein the chain is moved in a parabola track to smoothly engage with the sprockets of derailleur.

BACKGROUND OF THE INVENTION

A conventional chain shifting assembly for bicycles is shown in FIG. 6 and generally includes a four-link mechanism which includes a first link "A" which is connected to the bicycle frame by part "A1", a second link "B" which is pivotally connected to the first link "A", a third link "C" which is pivotally connected to the second link "B", and a fourth link "D" which is pivotally connected between the first link "A" and the third link "C". A derailleur cable 5 is fixed connected to the second link "B" and the other end of the cable 5 is connected to a shifter on the handlebar (both not shown) of the bicycle. A shift frame "C1" is connected to the third link "C" and is able to shift the chain 7 to engage with one of the sprockets 6 of the derailleur.

As shown in FIG. 7, when pulling the cable 5 by operating the shifter, the four-link mechanism is activated to move the shift frame "C1" to move the chain 7 from a small sprocket to a large sprocket. It is to be noted that, as shown in FIG. 8, the track that the chain 7 moves is basically on a horizontal plane and this horizontal movement can not make the chain 7 to smoothly change from the smaller sprocket to the larger sprocket. Therefore, the chain 7 could not well engage with the target sprocket and/or there will be a large friction between the sprockets 6 and the chain 7. Besides, this type of four-link mechanism is only used for the shifter on the handlebar. It needs another type of mechanism if the shifter is connected to the bicycle frame at a lower position.

SUMMARY OF THE INVENTION

In accordance with one aspect of the present invention, there is provided a chain shifting assembly for bicycles and the assembly comprises a fixed member fixed to a bicycle frame and an operation member is pivotally connected to the fixed member and includes a first arm, a second arm and a third arm. A derailleur cable is fixed to the second arm and a shifting member is pivotally connected to the first arm. A shift frame is connected to the other end of the shifting member. An angle limitation member is pivotally connected to the fixed member and the shifting member respectively. A spring is connected between the fixed member and the angle limitation member.

The primary object of the present invention is to provide a bicycle chain shifting assembly whose chain shift frame is moved along a parabola-shaped track.

Another object of the present invention is to provide a bicycle chain shifting assembly wherein the assembly can be used with the shifter located on the handlebar or the bicycle frame.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 1:
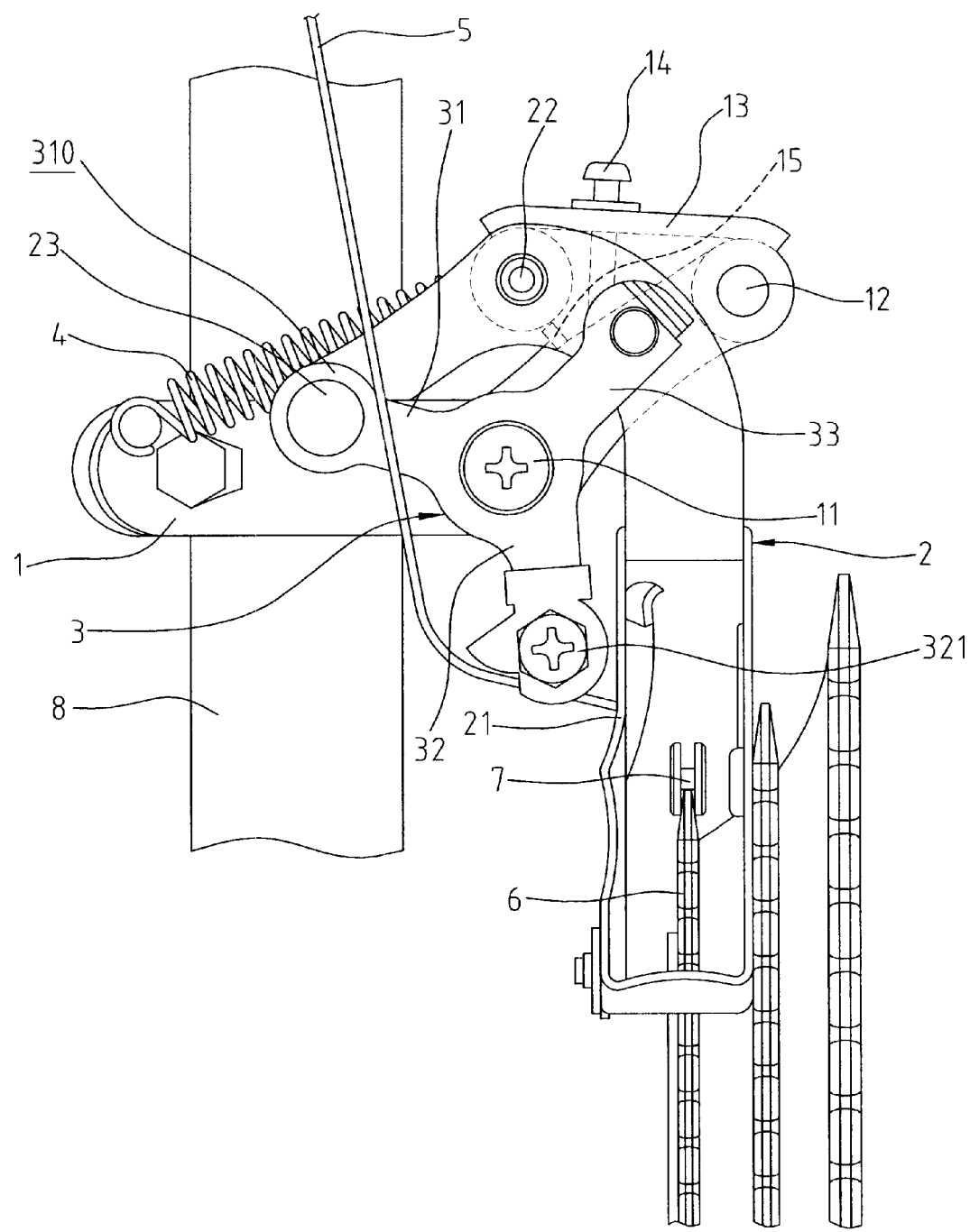
FIG. 1 is a side view to show the bicycle chain shifting assembly of the present invention.
Figure 2:
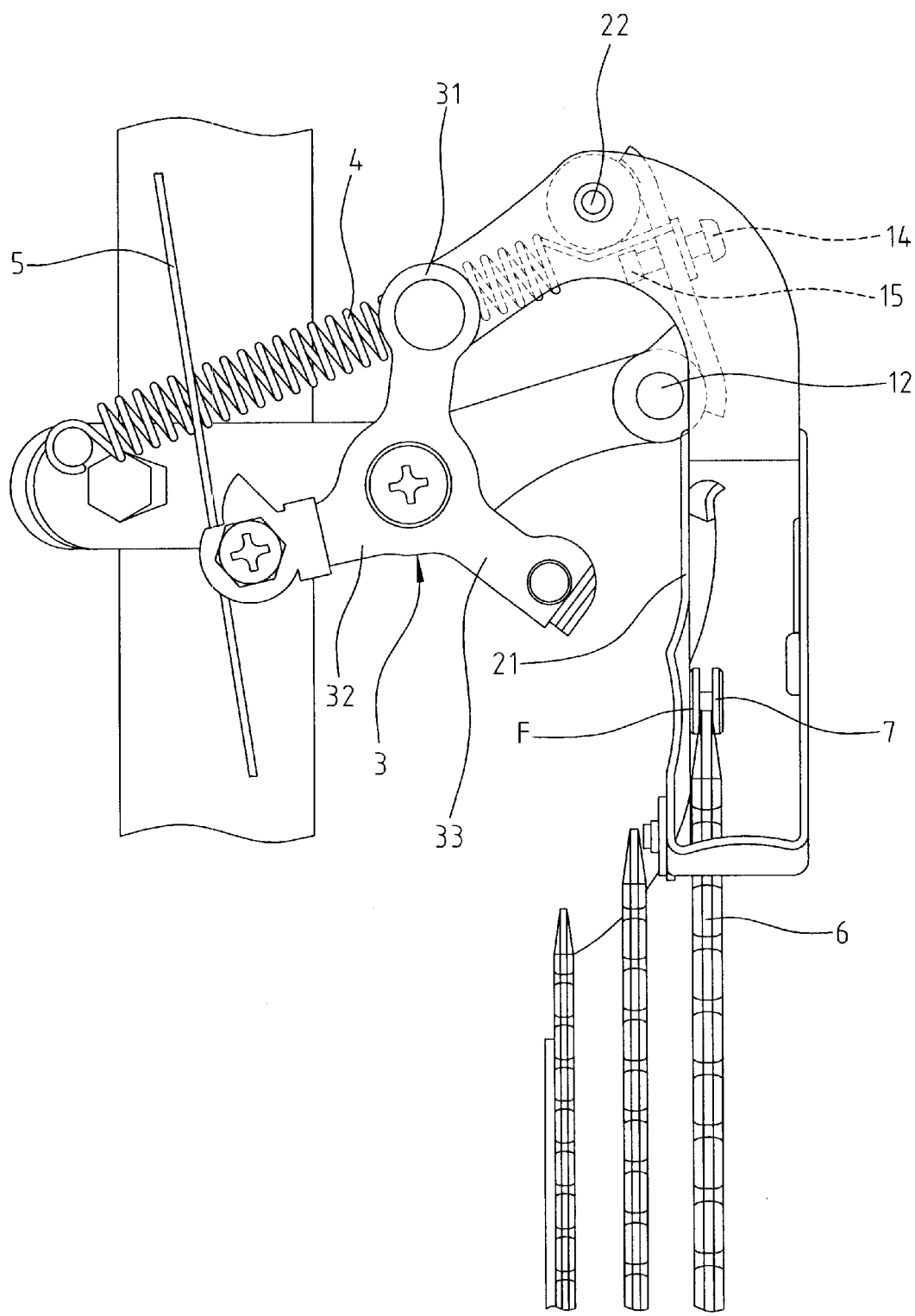
FIG. 2 is a side view to show the bicycle chain shifting assembly of the present invention, wherein the operation member is rotated to move the chain shift frame.

Referring to FIGS. 1 and 2, the chain shifting assembly for bicycles of the present invention comprises a fixed member 1 fixed to a bicycle frame 8 and an operation member 3 pivotally connected to the fixed member 1 at a center thereof by a bolt 11. The operation member 3 includes a first arm 31, a second arm 32 and a third arm 33, the three arms 31, 32 and 33 extend radially outward from the center of the operation member 3 (junction connecting the operation member 33 to the fixed member 1). A derailleur cable 5 has one end thereof fixed to the second arm 32 by a bolt 321 and an end of a shifting member 2 is pivotally connected to the first arm 31 by a rivet 23 pivotally connecting the shifting member 2 to a hole 310 in the first arm 31. A shift frame 21 is connected to the other end of the shifting member 2 and a chain 7 is located between two walls of the shift frame 21.

An angle limitation member 13 is pivotally connected to the fixed member 1 (via a spring 4) and the shifting member 21 at positions 12 and 22 respectively. A The spring 4 is connected between the fixed member 1 and the angle limitation member 13. The angle limitation member 13 has a block 15 extending therefrom and a bolt 14 extends through the angle limitation member 13. The bolt 14 contacts the block 15 to limit an angle between the angle limitation member 13 and the shifting member 2 as shown in FIG. 2, so that the block 15 limits further movement or pivot of the angle limitation member 13 when the operation member is activated by a shifter that pulls the derailleur cable 5, as shown in FIGS. 2 and 4.

When pulling the derailleur cable 5 by operating the shifter on handlebar (not shown), the operation member 3 is rotated about the bolt 11, the shifting member 2 is shifted as shown in FIG. 2 and the shift frame 21 pushes the chain 7 at the point "F" as shown in FIG. 2 from one sprocket to another. Referring to FIG. 5, the track of the shift frame 21 is a parabola and this track ensures the chain 7 moves upward and downward smoothly when changing the from one sprocket engaging point to another. When the chain 7 is to be moved from a larger sprocket 6 to a smaller sprocket 6, the spring 4 pulls the operation member 3 counter clockwise. As shown in FIGS. 2 and 4, the block 15 is attached to the shifting member 2.

Figure 3:
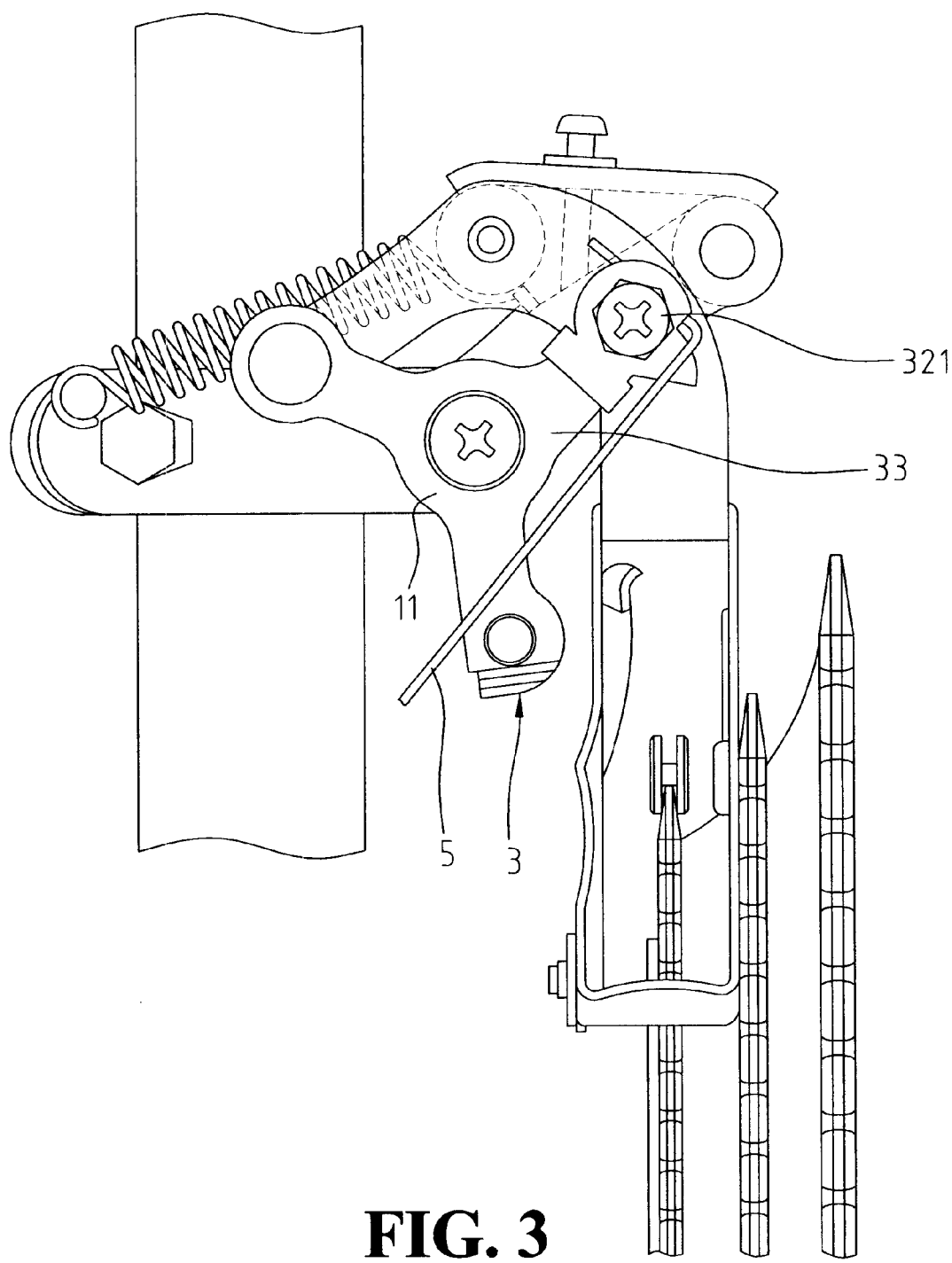
FIG. 3 is a side view to show the bicycle chain shifting assembly of the present invention wherein the cable is connected to the third arm of the operation member.
Figure 4:
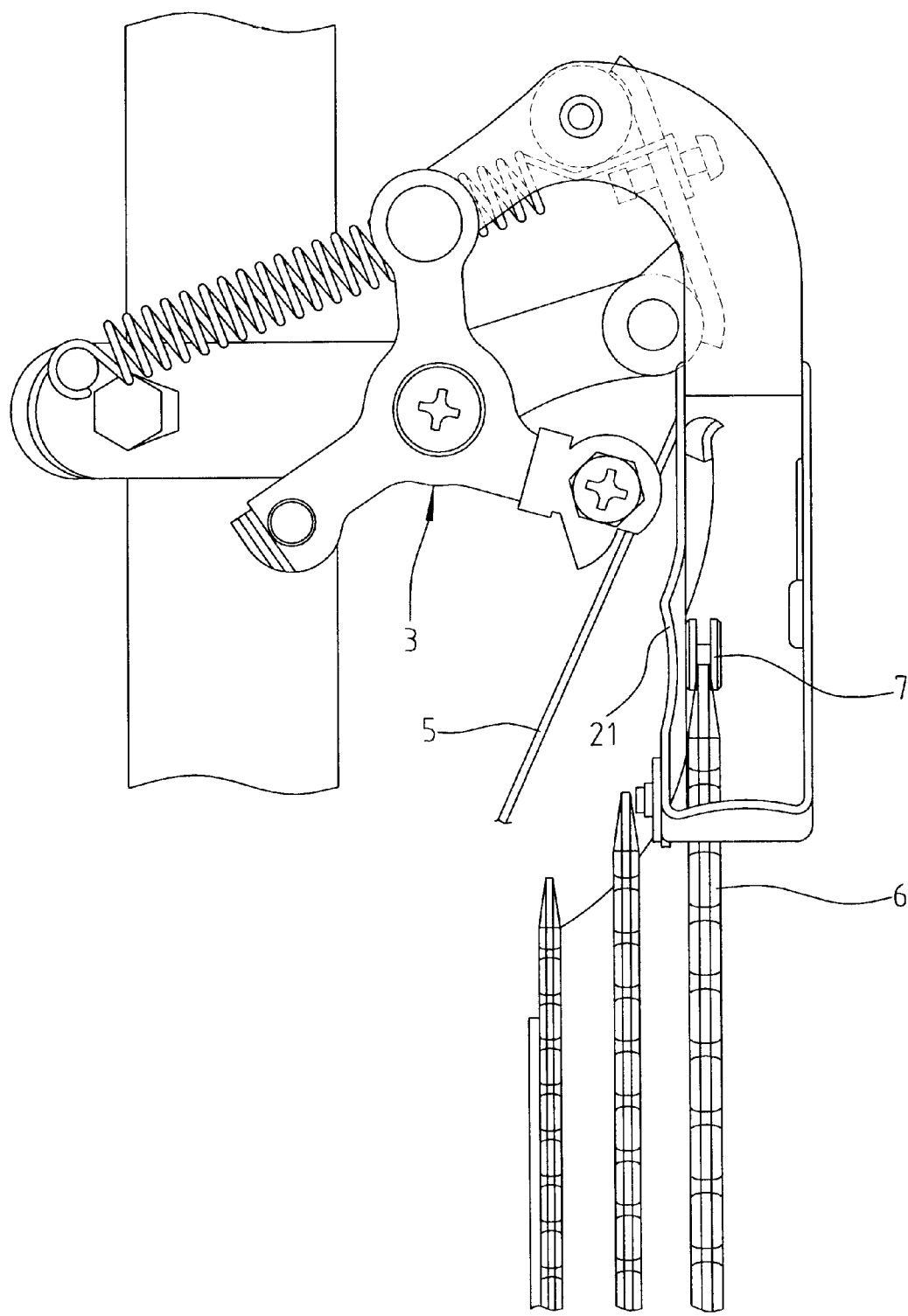
FIG. 4 is a side view to show the operation member of the bicycle chain shifting assembly as shown in FIG. 3 of the present invention is rotated.
Figure 5:
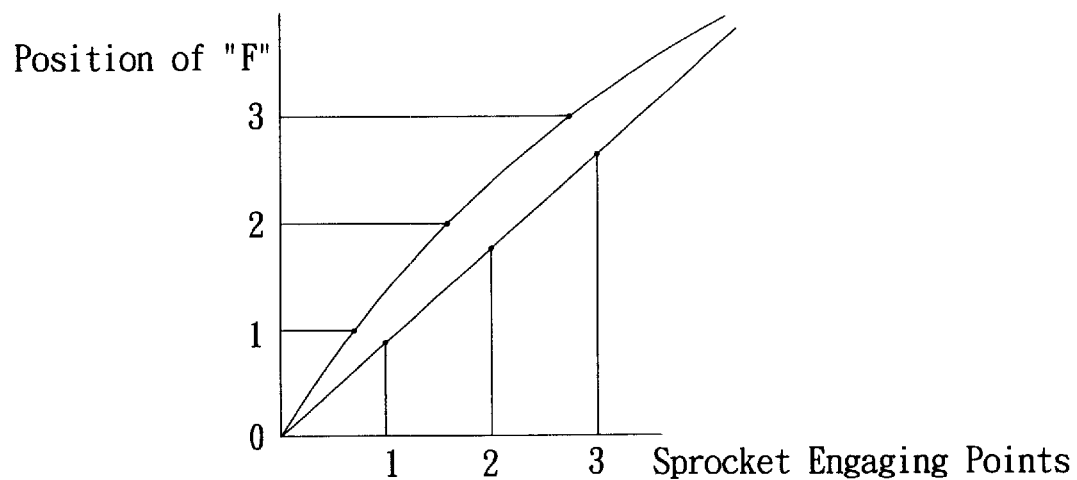
FIG. 5 is a diagram to show the track of the chain shift frame of the bicycle chain shifting assembly of the present invention is rotated.
Figure 8:
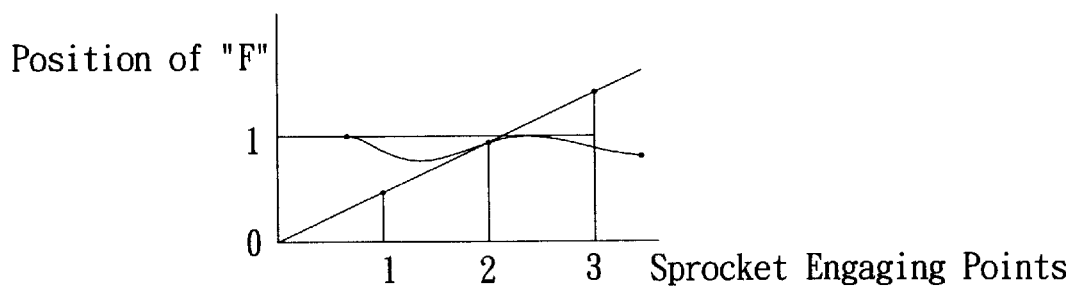
FIG. 8 is a diagram to show the track of the chain shift frame of the conventional bicycle chain shifting assembly.
Figure 6:
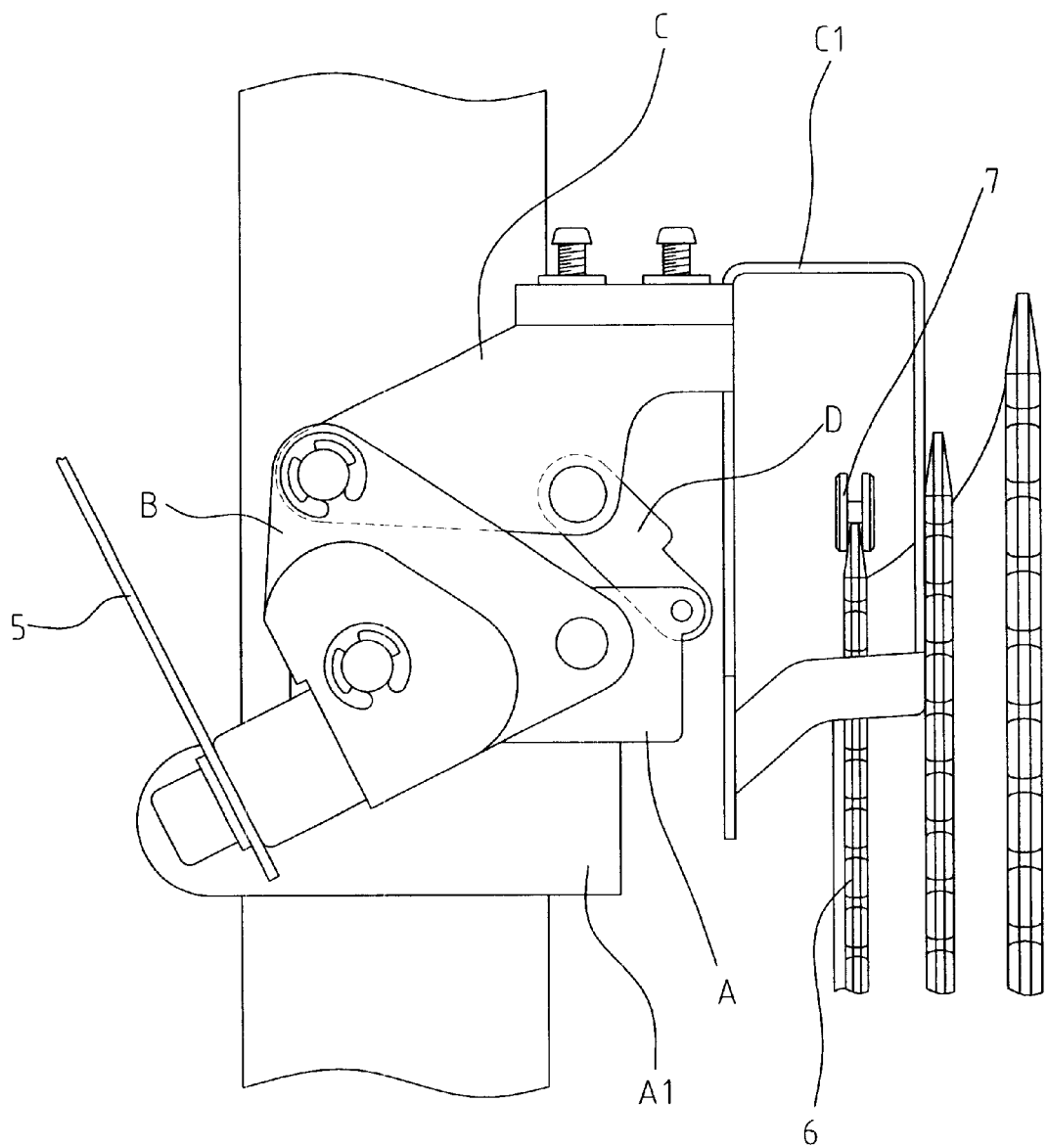
FIG. 6 is a side view to show a conventional bicycle chain shifting assembly.
Figure 7:
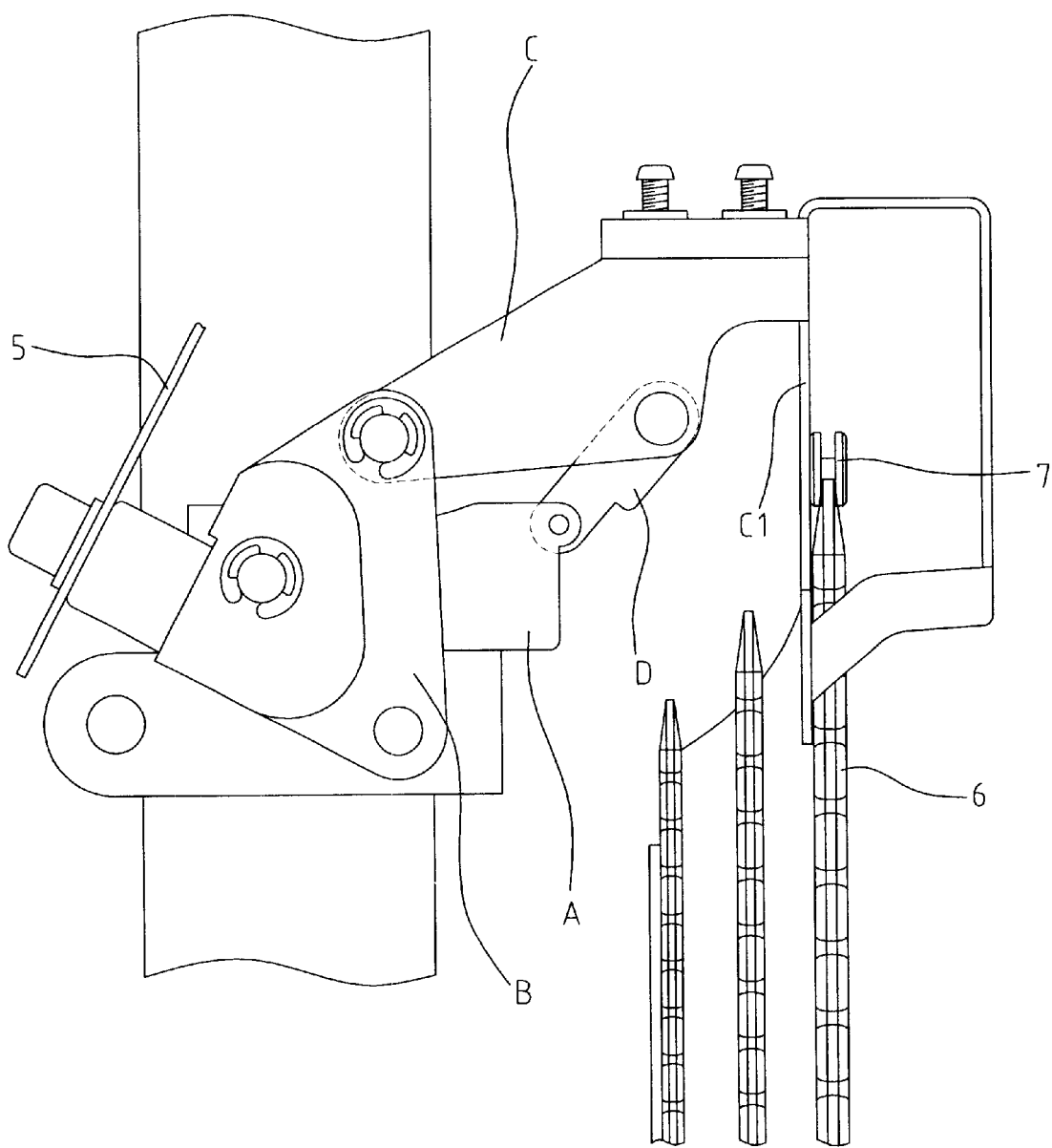
FIG. 7 is a side view to show the conventional bicycle chain shifting assembly, wherein the chain shift frame is moved.

Referring to FIGS. 3 and 4, the cable 5 may also be connected to the third arm 33 by a bolt 321 when the shifter is not connected to the handlebar. The operation member 3 is also rotated to shift the shifting member 2 when the cable 5 is pulled. The chain shifting assembly can be used with the shifter on the handlebar or on the bicycle frame.

While we have shown and described the embodiment in accordance with the present invention, it should be clear to those skilled in the art that further embodiments may be made without departing from the scope of the present invention.

What is claimed is:

1. A chain shifting assembly for bicycles comprising:

a fixed member adapted to be fixed to a bicycle frame;

an operation member pivotally connected to the fixed member at a junction, the operation member comprising first, second and third arms that each extends radially outwards from the junction pivotally connecting the operation member and the fixed member;

a derailleur cable having a first end fixed to the second arm of the operation member;

a shifting member having first and second ends, the first end of the shifting member is pivotally connected to the first arm of the operation member;

a shift frame connected to the second end of the shifting member;

an angle limitation member pivotally connected to the fixed member and the shifting member respectively; and a spring connected between the fixed member and the angle limitation member and the spring is configured to permit movement of the shifting member along a parabola-shaped track.

2. The assembly as claimed in claim 1, wherein a block is attached to the shifting member and a bolt extends through the angle limitation member, the bolt contacts the block to limit further pivot of the angle limitation member when the operation member is rotated by a shifter that pulls the derailleur cable.

3. The assembly as claimed in claim 1, wherein the firs second and third arms of the operation member are substantially equally spaced apart, and the first end of the derailleur is connectable to either the second arm or the third arm of the operation member.

* * * * *